(12) United States Patent
Watanabe et al.

(10) Patent No.: US 11,027,740 B2
(45) Date of Patent: Jun. 8, 2021

(54) ACCELERATION AND DECELERATION CONTROL SYSTEM AND ACCELERATION AND DECELERATION CONTROL METHOD

(71) Applicant: DENSO CORPORATION, Kariya (JP)

(72) Inventors: Daiji Watanabe, Kariya (JP); Toshiki Matsumoto, Kariya (JP); Hisaya Akatsuka, Kariya (JP)

(73) Assignee: DENSO CORPORATION, Kariya (JP)

( * ) Notice: Subject to any disclaimer, the term of this patent is extended or adjusted under 35 U.S.C. 154(b) by 118 days.

(21) Appl. No.: 16/330,940

(22) PCT Filed: Sep. 6, 2017

(86) PCT No.: PCT/JP2017/032156
§ 371 (c)(1),
(2) Date: Mar. 6, 2019

(87) PCT Pub. No.: WO2018/047873
PCT Pub. Date: Mar. 15, 2018

(65) Prior Publication Data
US 2019/0232965 A1 Aug. 1, 2019

(30) Foreign Application Priority Data
Sep. 8, 2016 (JP) .............................. JP2016-175524

(51) Int. Cl.
*B60W 40/072* (2012.01)
*B60W 50/038* (2012.01)
(Continued)

(52) U.S. Cl.
CPC ............. *B60W 40/072* (2013.01); *B60T 7/12* (2013.01); *B60W 40/076* (2013.01);
(Continued)

(58) Field of Classification Search
CPC ............. B60W 40/072; B60W 40/076; B60W 40/105; B60W 50/038; B60W 2552/30;
(Continued)

(56) References Cited

U.S. PATENT DOCUMENTS

2009/0037064 A1\* 2/2009 Nakamura ............. B60W 40/11
701/70
2012/0277965 A1 11/2012 Takahashi et al.

FOREIGN PATENT DOCUMENTS

| JP | 2008-230467 A | * 10/2008 | ............ B60W 10/00 |
| JP | 2009-051487 A | * 3/2009 | ............ G01C 21/00 |

(Continued)

*Primary Examiner* — Brian P Sweeney
(74) *Attorney, Agent, or Firm* — Maschoff Brennan

(57) ABSTRACT

A forward information acquisition unit acquires a road profile ahead of the own vehicle. A position acquisition unit acquires a current position of the own vehicle. A state acquisition unit acquires a current speed of the own vehicle. A command calculation unit calculates a target speed at each point on a road ahead of the own vehicle, based on the road profile and the current position, and calculates a drive command for driving the own vehicle in the longitudinal direction of the own vehicle, based on the target speed and the current speed. The road profile includes a road gradient. The command calculation unit is configured to adjust the drive command, based on variation in the road gradient and Gzmax that is an acceleration limit limiting acceleration of the own vehicle in the vertical direction.

10 Claims, 10 Drawing Sheets

(51) Int. Cl.
| | |
|---|---|
| *G01S 13/06* | (2006.01) |
| *B60W 40/105* | (2012.01) |
| *B60W 40/076* | (2012.01) |
| *B60T 7/12* | (2006.01) |
| *G08G 1/16* | (2006.01) |

(52) U.S. Cl.
CPC ........ *B60W 40/105* (2013.01); *B60W 50/038* (2013.01); *G01S 13/06* (2013.01); *G08G 1/16* (2013.01); *B60T 2230/04* (2013.01); *B60W 2552/30* (2020.02); *B60W 2556/50* (2020.02)

(58) Field of Classification Search
CPC ......... B60W 2556/50; B60W 2555/20; B60W 2552/15; B60W 50/0097; B60W 30/143; B60W 2720/103; B60T 7/12; B60T 2230/04; G08G 1/16; G01S 13/06
See application file for complete search history.

(56) References Cited

FOREIGN PATENT DOCUMENTS

| | | | | |
|---|---|---|---|---|
| JP | 2011-086000 A | | 4/2011 | |
| JP | 2013-014202 A | | 1/2013 | |
| JP | 2013-019680 A | * | 1/2013 | ............. B60K 31/00 |
| JP | 2015-058890 A | * | 3/2015 | ............ B60W 10/04 |
| JP | 2015-58890 A | | 3/2015 | |
| JP | 2018-039400 A | | 3/2018 | |

\* cited by examiner

ACCELERATION AND DECELERATION CONTROL SYSTEM AND ACCELERATION AND DECELERATION CONTROL METHOD

CROSS-REFERENCE TO RELATED APPLICATIONS

This application is a national stage application of PCT Application No. PCT/JP2017/032156, filed on Sep. 6, 2017, which claims the benefit of priority from earlier Japanese Patent Application No. 2016-175524 filed Sep. 8, 2016, all the description of which is incorporated herein by reference. Also, any applications for which a foreign or domestic priority claim is identified in the Application Data Sheet as filed with the present application are hereby incorporated by reference under 37 CFR 1.57.

TECHNICAL FIELD

The present disclosure relates to a technique for controlling acceleration and deceleration of the own vehicle.

BACKGROUND ART

Techniques for controlling acceleration and deceleration of the own vehicle are well known. These techniques are applied to the system for controlling acceleration and deceleration of the own vehicle to appropriately obtain a deceleration region when approaching a curve, a constant speed region when traveling on the curve, and an acceleration region when departing from the curve.

For example, PTL 1 describes an acceleration and deceleration control system that uses a turning radius at each node on a curve, and a preset lateral acceleration of the own vehicle to calculate a target speed at the node. This acceleration and deceleration system calculates a target acceleration in the longitudinal direction of the own vehicle, based on the calculated target speed and the current speed of the own vehicle. Further, this acceleration and deceleration control system is configured to calculate, from the calculated target acceleration, a drive command to which a variation limiter associated with acceleration and deceleration in the longitudinal direction of the own vehicle is added.

CITATION LIST

Patent Literature

Summary of the Invention

As set forth above, the acceleration and deceleration system of PTL 1 is configured such that an excessive lateral centrifugal force is less likely to act on the occupant of the own vehicle due to use of the preset lateral acceleration. Moreover, this acceleration and deceleration system is configured such that an excessive longitudinal force of acceleration or deceleration is less likely to act on the occupant of the own vehicle due to use of the variation limiter associated with acceleration and deceleration.

However, as a result of elaborate researches and studies of the inventors, the following issue has been found. Specifically, since the position of the own vehicle changes three-dimensionally in relation to the actual road profile, mere use of a preset lateral acceleration and a variation limiter associated with longitudinal acceleration and deceleration would make the occupant feel excessive uneasiness, such as a floating feeling, during traveling of the own vehicle.

An aspect of the present disclosure is to provide a technique for preventing a vehicle occupant from feeling excessive uneasiness, such as a floating feeling due to acceleration and deceleration control during traveling of the own vehicle.

An acceleration and deceleration system that is an aspect of the present disclosure includes a forward information acquisition unit, a position acquisition unit, a state acquisition unit, and a command calculation unit. The forward information acquisition unit is configured to acquire a road profile ahead of the own vehicle. The position acquisition unit is configured to acquire a current position of the own vehicle. The state acquisition unit is configured to acquire a current speed of the own vehicle. The command calculation unit is configured to calculate a target speed at each point on a road ahead of the own vehicle, based on the road profile and the current position, and calculate a drive command for driving the own vehicle in the longitudinal direction of the own vehicle, based on the target speed and the current speed.

The road profile includes a road gradient. The command calculation unit is configured to adjust the drive command, based on Gzmax and variation in the road gradient, where the Gzmax is an acceleration limit limiting acceleration of the own vehicle in the vertical direction.

With this configuration, in the acceleration and deceleration control of the own vehicle, the own vehicle is less likely to suffer from an excessive force of acceleration or deceleration in the vertical direction when the road gradient varies. Thus, the occupant is less likely to feel excessive uneasiness, such as a floating feeling, during traveling.

The bracketed reference signs in the claims indicate correspondence with the specific means described in each embodiment provided below as an aspect, and should not limit the technical scope of an aspect of the present disclosure.

DESCRIPTION OF THE EMBODIMENTS

With reference to the drawings, some embodiments of the present disclosure will be described.

1. First Embodiment

(1-1. Overall Configuration)

Figure 1:
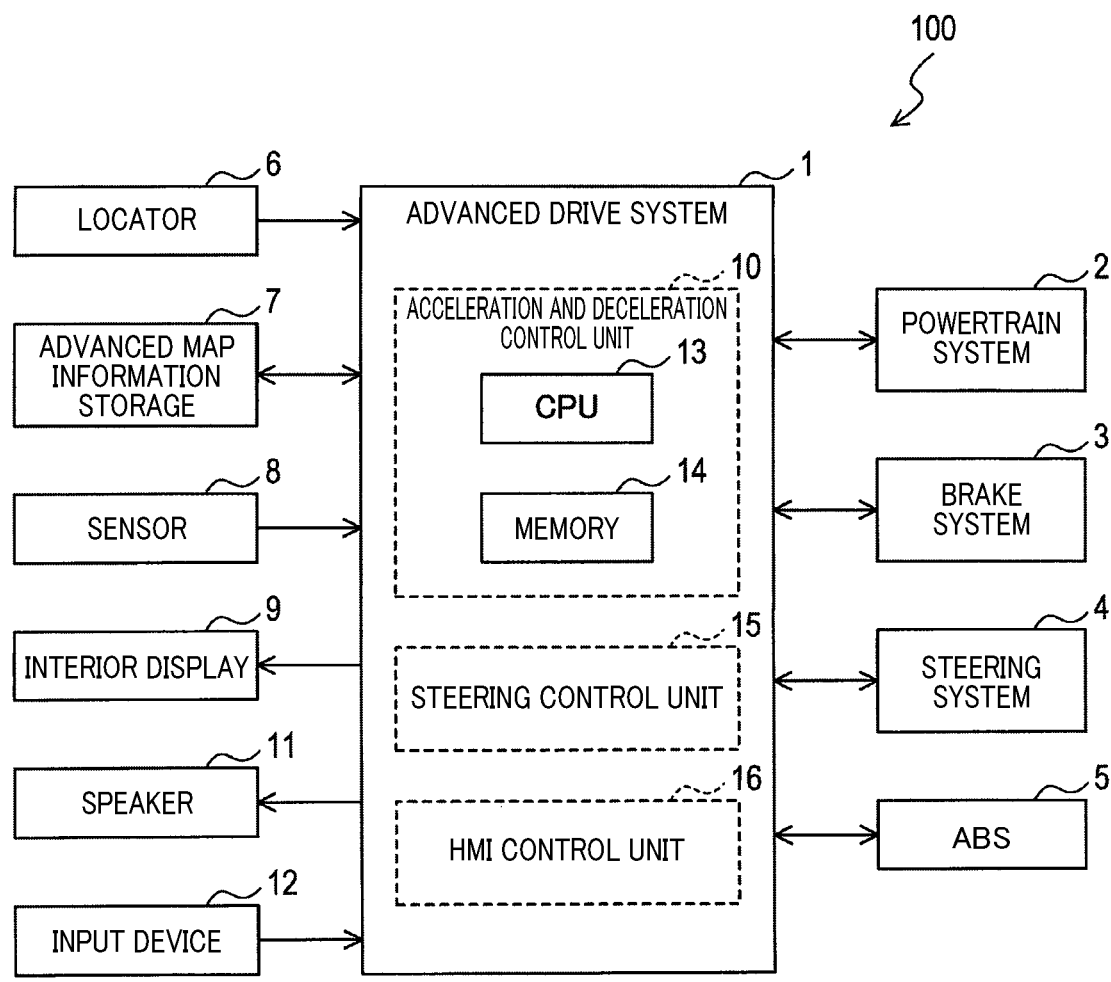
FIG. 1 is a block diagram illustrating a configuration of an advanced drive system.

As shown in FIG. 1, a vehicle 100 includes an advanced drive system 1 which includes an acceleration and deceleration control unit 10 for controlling acceleration and deceleration of the own vehicle. The advanced drive system 1 corresponds to an acceleration deceleration control system.

The vehicle 100 includes various control systems, such as a powertrain system 2, a brake system 3, a steering system 4, and an antilock braking system 5 (hereinafter referred to as the ABS 5). These control systems 2 to 5 and the advanced drive system 1 are connected to an in-vehicle local network (hereinafter referred to as the in-vehicle LAN), not shown. These control systems 2 to 5 and the advanced drive system 1 are configured to share control information, such as control command or controlled variable, through communication via the in-vehicle LAN.

Figure 2:
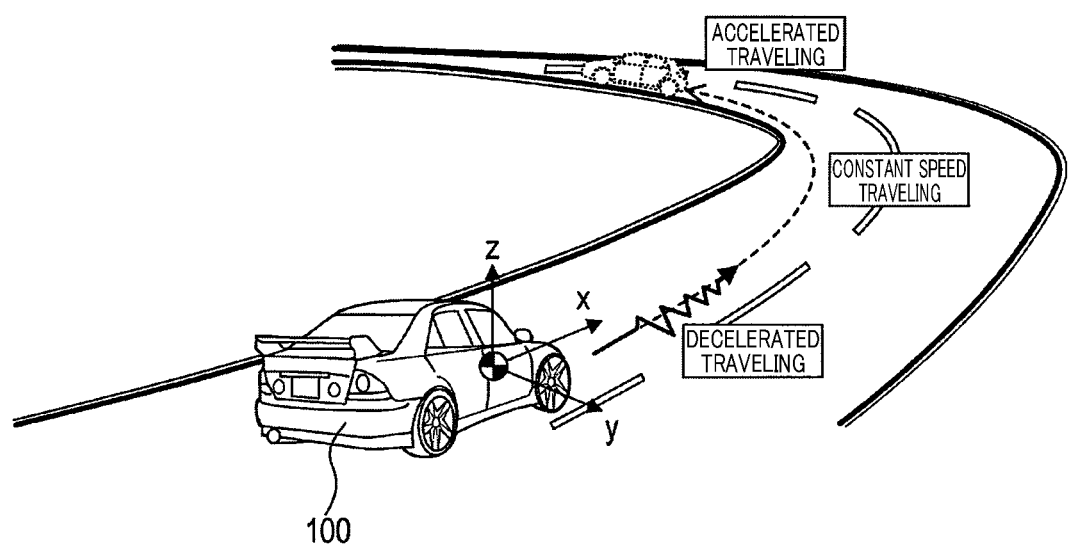
FIG. 2 is a diagram illustrating an overview of the advanced drive system.

The advanced drive system 1, when activated, performs acceleration and deceleration control so that the vehicle 100 can travel autonomously, without the need of driver's operation, and, when deactivated, transfers the authority related to driving operation to the driver or another control system. As shown in FIG. 2, the advanced drive system 1 is configured to allow the acceleration and deceleration control unit 10 to control acceleration and deceleration of the vehicle 100 so as to appropriately obtain a deceleration region when approaching a curve, a constant speed region when traveling on the curve, and an acceleration region when departing from the curve.

In the following description, as shown in FIG. 2, the axis along the length of the vehicle 100 (i.e. longitudinal direction) is taken to be the x axis, the axis along the width of the vehicle 100 (i.e. lateral direction) is taken to be the y axis, and the axis along the direction of the height of the vehicle 100 (i.e. vertical direction) is taken to be the z axis. These x, y and z axes are perpendicular to each other.

Referring back to FIG. 1, the advanced drive system 1 is connected to a locator 6, an advanced map information storage 7, a sensor 8, an interior display 9, a speaker 11, and an input device 12.

The sensor 8 includes a vehicle-speed sensor, an acceleration sensor, a gyro sensor, an image sensor, a radar sensor, an accelerator-position sensor, a brake-position sensor, a shift-position sensor, or a steering sensor, which are not shown. The vehicle-speed sensor detects a current speed of the vehicle 100. The accelerator sensor detects current accelerations Gx, Gy and Gz along the x, y and z axes, respectively, of the vehicle 100. The gyro sensor detects angular velocities (i.e. yaw rates) of respective rotations about the x, y and z axes.

The image sensor and the radar sensor detect various targets, such as an obstacle, another vehicle, a pedestrian, a sign, a lane line, and a structural object, road surface conditions, and the like. The accelerator-position sensor detects a depressed position and a depressing speed of the accelerator pedal. The brake position sensor detects a depressed position and a depressing speed of the brake pedal. The shift-position sensor detects a shift lever position. The steering sensor detects a steering angle of the steering wheel.

The input device 12 includes a communication device, in addition to a touch panel, mechanical switches, and the like, which are not shown, for receiving the user's input operation. The communication device not only performs vehicle-vehicle communication to communicate with another vehicle, and road-vehicle communication to communicate with an infrastructure, but also establishes connection with an internet to acquire various pieces of information including weather information in the vicinity of the vehicle 100.

The locator 6 serves as a device for receiving radio waves from quasi-zenith satellites or GPS satellites to produce position information indicating the current position of the vehicle 100. The current position indicated by the position information is complemented using detection of at least one of the vehicle-speed sensor, the acceleration sensor, the gyro sensor, the image sensor, and the radar sensor.

The advanced map information storage 7 serves as a device for storing advanced map information in which the map information that indicates the road profile, including gradient, curvature radius, or the like of the road, is associated with the environmental information, including the current position of the vehicle 100, or the like. The map information stores not only road information including nodes and links, but also three-dimensional coordinates indicated by the nodes, three-dimensional road profiles including the widths, curvature radii, gradients, or the like indicated by the links, or speed limits (i.e. legal speeds) of roads, or the like. The nodes indicated by the road information are provided to the lanes of each road. A number of such nodes are provided, with the link length being permitted to be shorter than that used for generally used navigation devices. Such nodes are also provided to the points where the road gradient changes.

The interior display 9 is provided in the interior of the vehicle 100 to display an image. The interior display 9 may be a liquid crystal display that is set up in the center console or the dashboard, or may be a meter display, a headup display, or the like. For example, the headup display gives prior notification to the driver when the vehicle 100 is accelerated or decelerated, or displays the road profile or the like ahead of the own vehicle, while the advanced drive system 1 is activated. The speaker 11 is provided in the interior of the vehicle 100 to not only output various audio assists, warnings, or the like, but also audibly output a prior notification to the driver, regarding activation or deactivation of the advanced drive system 1.

While the advanced drive system 1 is activated, the powertrain system 2 controls the driving source and the transmission of the vehicle 100 according to a drive command outputted from the advanced drive system 1. The powertrain system 2, if an internal combustion engine is installed thereto as a driving source, controls the opening degree, the fuel combustion quantity, or the like of the throttle device, and, if a motor is installed thereto as a driving source, controls electrical power supplied to the motor. In a state where the advanced drive system 1 is deactivated, the powertrain system 2 chiefly performs control according to detections of the accelerator-position sensor and the shift-position sensor. However, in a state where the TCS, described later, is activated, the powertrain system 2 performs control according to the drive command outputted from the TCS.

In a state where the advanced drive system 1 is activated, the brake system 3 controls, for example, the actuator or the like provided to the hydraulic circuit of the oil brake, according to the drive command outputted from the advanced drive system 1. The brake system 3 may be so configured to control the electrical power supplied to the motor to generate a braking force based on regenerative brake. In a state where the advanced drive system 1 is deactivated, the brake system 3 chiefly performs control according to the detection of the brake-position sensor.

However, during activation of the TCS or the ABS 5, the brake system 3 performs control according to the drive command outputted from the TCS or the ABS 5.

In a state where the advanced drive system 1 is activated, the steering system 4 controls the rotation direction, the rotation rate, or the like of the pinion gear provided to the steering mechanism, according to the steering command outputted from the advanced drive system 1. In a state where the advanced drive system 1 is deactivated, the steering system 4 chiefly performs control according to the detection of the steering sensor. The steering system 4 may be configured to also perform control according to the detection of the steering sensor, in a state where the advanced drive system 1 is activated. In a state where the advanced drive system 1 is activated, the steering system 4 may be configured to perform steering assist control of generating torque for assisting the driver's steering operation, according to the steering command outputted from the advanced steering system 1.

The ABS 5 is a known system for reducing skidding due to the vehicle wheels being locked when decelerating the own vehicle 100. For example, the ABS 5 controls the brake system 3 if the rotation of the wheels is determined to have exceeded a predetermined deceleration degree, based the detection of the vehicle-speed sensor. Also, the ABS 5 is so configured to output information indicating the time point of starting or ending such control over the brake system 3, to the advanced drive system 1.

Besides the ABS 5, a traction control system (hereinafter referred to as the TCS), not shown, is installed as a control system for preventing such skidding of the wheels of the vehicle 100. It is known that the TCS monitors the road-hugging conditions of the wheels for the road surface, and controls the brake system 3 or the powertrain system 2 if, for example, a driving wheel is detected to be spinning when starting or accelerating the vehicle 100 to thereby minimize the occurrence of skidding of the vehicle 100. The TCS is also configured to output information indicating the time point of starting or ending such control over the brake system 3 or the powertrain system 2, to the advanced drive system 1.

The advanced drive system 1 includes the acceleration and deceleration control unit 10, a steering control unit 15 and a human-machine interface control unit 16 (hereinafter referred to as the HMI control unit 16). These control units 10, 15 and 16 are each mainly configured as a well-known microcomputer including a CPU 13, a RAM, a ROM, and a semiconductor memory (hereinafter referred to as the memory 14), such as a flash memory. The control units 10, 15 and 16 each have various functions that are achieved by the CPU 13 executing a program stored in a non-transitory tangible recording medium. In the present example, the memory 14 corresponds to the non-transitory tangible recording medium that stores the program. With this program being executed, a method corresponding to the program is executed. These control units 10, 15 and 16 may each be configured by a single computer or a plurality of computers. Alternatively, a single computer may configure the plurality of control units 10, 15 and 16.

The HMI control unit 16 notifies the driver of necessary information via the interior display 9 or the speaker 11, based on the input from the acceleration and deceleration control unit 10 or the steering control unit 15.

The steering control unit 15 determines a target yaw rate or a target steering angle, and generates and outputs a steering command needed for controlling the steering system 4. The steering control unit 15 generates and outputs a steering command to realize driving support for assisting steering required for traveling on a curve or changing lanes, or automatic steering not requiring the driver's operation.

(1-2. Configuration of the Acceleration and Deceleration Control Unit 10)

Figure 3:
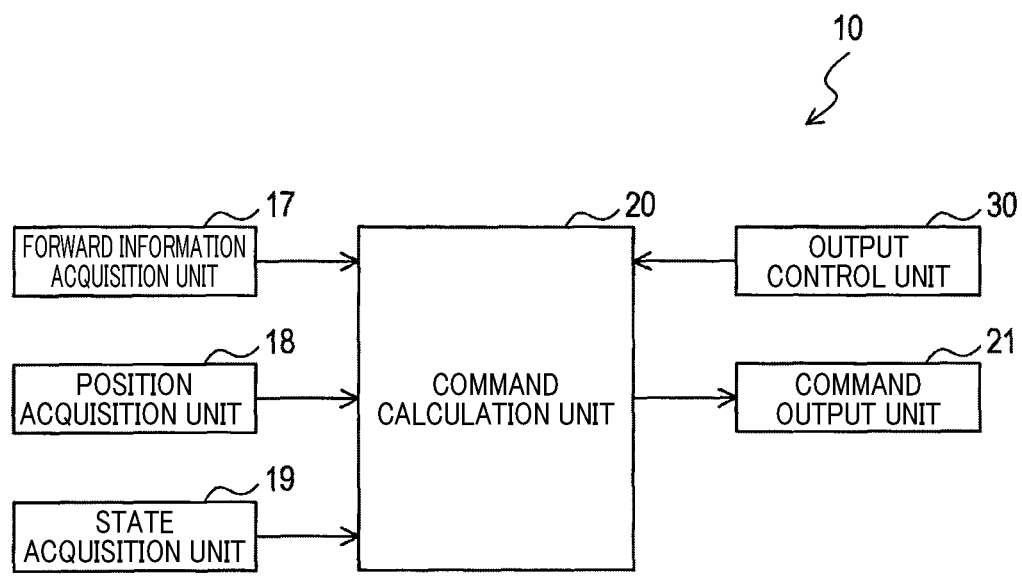
FIG. 3 is a block diagram illustrating a configuration of an acceleration and deceleration control unit.

As shown in FIG. 3, the acceleration and deceleration control unit 10 includes a forward information acquisition unit 17, a position acquisition unit 18, a state acquisition unit 19, a command calculation unit 20, a command output unit 21, and an output control unit 30, as configurations of the functions realized by the CPU 13 executing the program. The method of realizing the components configuring the acceleration and deceleration control unit 10 is not limited to software. Part or all of the components may be realized by a single hardware device or a plurality of hardware devices. For example, if the above functions are realized by an electronic circuit, the electronic circuit may be realized by a digital circuit, an analog circuit, or a combination thereof, including a number of logic circuits.

The forward information acquisition unit 17 is configured to acquire a road profile ahead of the own vehicle. Specifically, the forward information acquisition unit 17 acquires a road profile, including the gradient and the curvature radius of the road ahead of the own vehicle, based on the current position of the vehicle 100 acquired from the position acquisition unit 18, and the road information around the current position of the vehicle 100 outputted from the advanced map information storage 7. The forward information acquisition unit 17 may be configured to correct the road profile ahead of the own vehicle, based on an image that includes the road surface ahead of the own vehicle captured by the image sensor. In the present embodiment, the forward information acquisition unit 17 not only acquires the road profile ahead of the own vehicle, but also acquires from the image sensor the road surface conditions associated with the road ahead of the own vehicle, and acquires from the communication device the information indicating the weather in the vicinity of the own vehicle.

The position acquisition unit 18 is configured to acquire the current position of the own vehicle. Specifically, the position acquisition unit 18 corrects the current position indicated by the position information outputted from the locator 6, based on the detection of the sensor 8 to thereby acquire the current position of the vehicle 100.

The state acquisition unit 19 is configured to acquire the traveling state of the own vehicle. Specifically, the state acquisition unit 19 chiefly acquires the current speed, current accelerations $Gx$, $Gy$ and $Gz$, the steering angle, the yaw rate, and the like, as the traveling state of the vehicle 100, based on the information outputted from the sensor 8. It should be noted that the current accelerations $Gx$, $Gy$ and $Gz$, if they are positive values, indicate acceleration of the vehicle 100, and if negative values, indicate deceleration of the vehicle 100. The state acquisition unit 19 uses the current accelerations $Gx$, $Gy$ and $Gz$ of the previous and current cycles as bases to respectively calculate jerks $\Delta Gx$, $\Delta Gy$ and $\Delta Gz$ each indicating a rate of change in acceleration per unit time.

The command output unit 21 is configured to output a drive command for driving the own vehicle in the longitudinal direction to the powertrain system 2 and the brake system 3. The drive command refers to a physical quantity indicating a driving force or a braking force of the vehicle 100, and is calculated by a command calculation unit 20 which will be described below.

(1-3. Configuration of the Command Calculation Unit 20)

Figure 4:
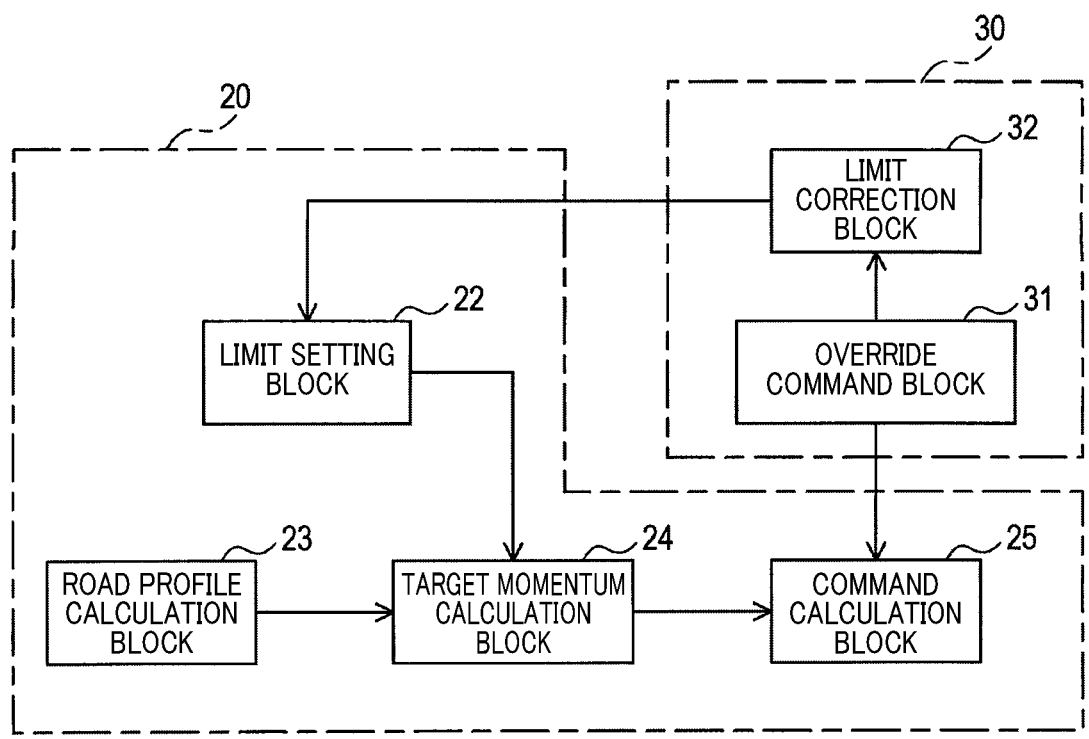
FIG. 4 is a first block diagram illustrating configurations of a command calculation unit and an output control unit.

As shown in FIG. 4, the command calculation unit 20 includes a limit setting block 22, a road profile calculation block 23, a target momentum calculation block 24, and a command calculation block 25.

The limit setting block 22 is configured to set a value (hereinafter referred to as the limit) for limiting at least one of the speed, the acceleration, and the jerk of the own vehicle. Of these limits, ones (hereinafter referred to as the user-set value(s)) which are inputted by the user in advance are stored in the memory 14. For example, the limit setting block 22 selects either one of the user-set value or the legal speed associated with the road on which the own vehicle is currently traveling, as a limit related to speed (hereinafter referred to as the speed limit), and outputs the selected speed limit, as Vlim, to the target momentum calculation block 24. Specifically, the limit setting block 22 outputs, as Vlim, a smaller one of the user-set value and the legal speed. The legal speed is read from the advanced map information storage 7.

The limit setting block 22 is configured to output at least one of the limit (hereinafter referred to as the acceleration limit) related to acceleration and the limit related to jerk (hereinafter referred to as the jerk limit), to the target momentum calculation block 24. Specifically, the limit setting block 22 outputs the acceleration limit or the jerk limit inputted in advance as a user-set value, to the target momentum calculation block 24, together with the speed limit Vlim. The acceleration limit or the jerk limit is expressed with an absolute value and is set for each of the x, y and z axes. In the following description, the acceleration limit limiting the vertical acceleration of the own vehicle is indicated by Gzmax, the acceleration limit limiting the lateral acceleration of the own vehicle is indicated by Gymax, and the acceleration limit limiting the longitudinal acceleration of the own vehicle is indicated by Gxmax. Also, the jerk limit that limits the vertical jerk of the own vehicle is indicated by ΔGzmax, the jerk limit that limits the lateral jerk of the own vehicle is indicated by ΔGymax, and the jerk limit that limits the longitudinal jerk of the own vehicle is indicated by ΔGxmax.

The road profile calculation block 23 is configured to perform calculation related to the road profile ahead of the own vehicle. Specifically, the road profile calculation block 23 is configured to calculate a rate of change of a road gradient at each node ahead of the own vehicle, based on the road profile ahead of the own vehicle acquired by the forward information acquisition unit 17. The rate of change of the road gradient at each node is expressed by the difference between the road gradients respectively indicated by two links connected to the node.

The target momentum calculation block 24 is configured to calculate a target momentum of the own vehicle. Specifically, the target momentum calculation block 24 calculates, as a target momentum, at least one of a target speed and a target acceleration at each point on the road ahead of the own vehicle, based on the road profile ahead of the own vehicle and the current position of the own vehicle. In the present embodiment, the target momentum calculation block 24 is configured to calculate a target speed at each node ahead of the own vehicle, and output the calculated target speed to the command calculation block 25.

The command calculation block 25 is configured to calculate a drive command. Specifically, the command calculation block 25 calculates a target acceleration at each node ahead of the own vehicle, based on the target speed calculated by the target momentum calculation block 24, and the current speed of the own vehicle. Then, based on the calculated target acceleration, the command calculation block 25 calculates a drive command for driving the own vehicle in the longitudinal direction of the own vehicle. The target acceleration, if it is a positive value, indicates acceleration of the vehicle 100, and if a negative value, indicates deceleration of the vehicle 100. Further, the command calculation block 25 is configured to output the calculated drive command to the powertrain system 2 and the brake system 3 via the command output unit 21.

(1-4. Configuration of the Output Control Unit 30)

The output control unit 30 includes an override command block 31 and a limit correction block 32.

The override command block 31 is configured to control the output of the drive command from the command output unit 21, based on at least either of the input from the operation of the driver of the own vehicle and the input from another control system of the own vehicle. Specifically, the override command block 31 detects, as the driver's operation, one of accelerator pedal operation, brake pedal operation, and the shift lever operation. Then, if the accelerator pedal or the brake pedal is determined to have been depressed by not less than a predetermined amount, for example, the override command block 31 outputs a switching signal 0 to the command calculation block 25. Also, for example, if the transmission gear is determined to have been shifted down or up, the override command block 31 outputs a switching signal 0 to the command calculation block 25.

Moreover, if there is an input of timing information related to start of control from the ABS 5 or the TSC, as another control system, the override command block 31 outputs a switching signal 0 to the command calculation block 25. Thus, in response to the output of a switching signal 0, the command calculation block 25 stops calculation of the drive command. Consequently, the command output unit 21 stops output of the drive command, thereby deactivating the advanced drive system 1. In other words, the authority of driving is transferred from the advanced drive system 1 to the driver or another control system.

If it is determined that none of the accelerator pedal, the brake pedal and the shift lever is operated, or if there is an input of timing information related to termination of control from the ABS 5 or the TSC, the override command block 31 outputs a switching signal 1 to the command calculation block 25. Thus, in response to the output of the switching signal 1, the command calculation block 25 restarts calculation of the drive command. Consequently, the command output unit 21 restarts output of the drive command, thereby reactivating the advanced drive system 1. In other words, the authority of driving is transferred from the driver or other control systems to the advanced drive system 1.

The limit correction block 32 is configured to temporarily reduce the acceleration limit or the jerk limit outputted from the limit setting block 22. The acceleration limit is temporarily reduced when the output of the drive limit that has been stopped is restarted by the output control over the drive command as conducted by the override command block 31. Specifically, if the limit setting block 22 is configured to output an acceleration limit, the limit correction block 32 temporarily reduces the acceleration limit. If the limit setting block 22 is configured to output a jerk limit, the limit correction block 32 temporarily reduces the jerk limit. In the present specification, the expression "reduce a value" refers to "reduce an absolute value".

Figure 5:
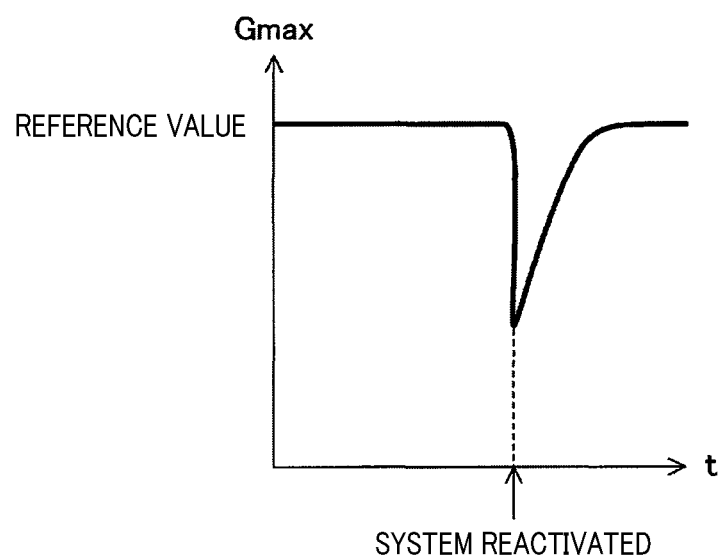
FIG. 5 is a graph illustrating variation in acceleration limit.

For example, in the former case, as shown in FIG. 5, the limit correction block 32 temporarily reduces the acceleration limit when the advanced drive system 1 is reactivated.

After that, the limit correction block 32 outputs a command to the limit setting block 22, for gradual increase of the acceleration limit to a reference value that is the acceleration limit before being reduced. In this case, the increasing rate of the acceleration limit may be linear or non-linear.

Figure 6:
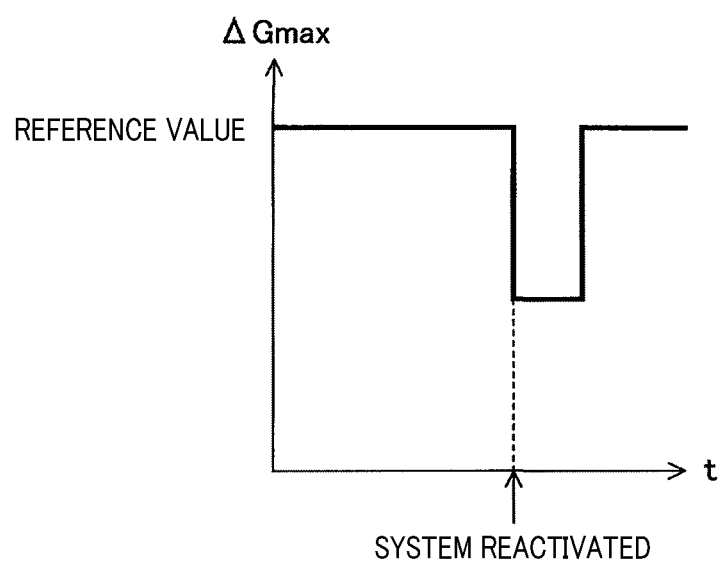
FIG. 6 is a graph illustrating variation in jerk limit.

For example, in the latter case, as shown in FIG. 6, the limit correction block 32 temporarily reduces the jerk limit when the advanced drive system 1 is reactivated. After lapse of a predetermined period, the limit correction block 32 outputs a command to the limit setting block 22, for restoration of the jerk limit to a reference value that is the jerk limit before being reduced.

In FIG. 5, Gmax indicates at least one of the acceleration limits of Gzmax, Gymax and Gxmax. In FIG. 6, ΔGmax indicates at least one of the jerk limits of ΔGzmax, ΔGymax and ΔGxmax. Specifically, when the advanced drive system 1 is reactivated, the limit correction block 32 variably sets at least one of the acceleration limits of Gzmax, Gymax and Gxmax, or at least one of the jerk limits of ΔGzmax, ΔGymax and ΔGxmax. In the present embodiment, the limit correction block 32 is configured to variably set Gxmax or ΔGxmax when the advanced drive system 1 is reactivated. Specifically, if the limit setting block 22 is configured to output an acceleration limit, the limit correction block 32 variably sets Gxmax. If the limit setting block 22 is configured to output a jerk limit, the limit correction block 32 variably sets ΔGxmax.

(1-5. Target Momentum Calculation Process)

Figure 7:
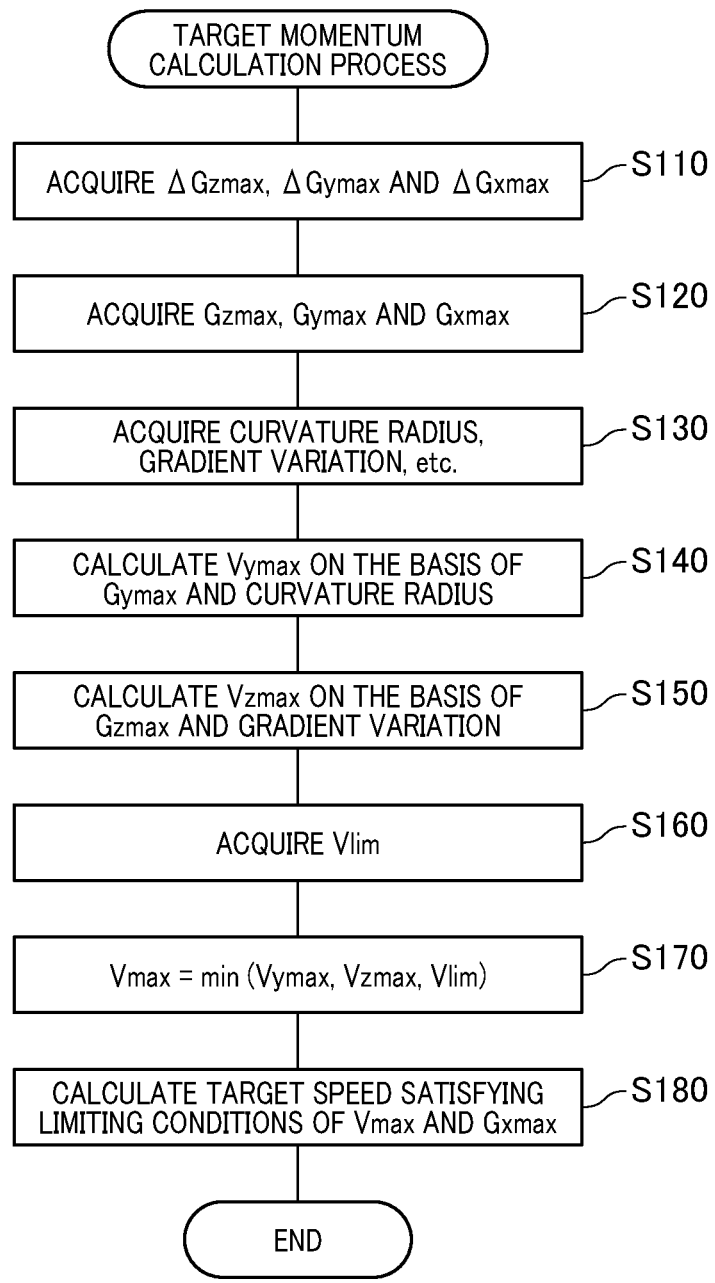
FIG. 7 is a flow diagram illustrating a target momentum calculation process.

Referring now to the flow diagram of FIG. 7, a description will be given of a process (hereinafter referred to as the target momentum calculation process) performed by the target momentum calculation block 24. In the target momentum calculation process, the target momentum calculation block 24 calculates a target speed at each node ahead of the own vehicle. In this process, an object node is sequentially extracted from the road profile, starting from the one nearest to the current position of the vehicle 100, and a target speed is calculated for each extracted node (hereinafter referred to as the object node). The target momentum calculation process is iterated while the advanced drive system 1 is activated.

Upon start of the present process, if the limit setting block 22 is configured to output a jerk limit, the target momentum calculation block 24 firstly acquires, at step (hereinafter indicated by S) 110, ΔGzmax, ΔGymax and ΔGxmax, as jerk limits, from the limit setting block 22.

Then, at S120, the target momentum calculation block 24 respectively multiplies the current accelerations Gz, Gy and Gx by ΔGzmax, ΔGymax and ΔGxmax acquired at S110 to acquire Gzmax, Gymax and Gxmax, respectively, as acceleration limits. If there are acceleration limits of an object node extracted in the previous cycle, the target momentum calculation block 24 respectively multiplies these acceleration limits by the jerk limits acquired at S110 to acquire acceleration limits related to the object node extracted in the present cycle. This calculation is not required if the limit setting block 22 is configured to output an acceleration limit. In this case, the target momentum calculation block 24 can acquire Gzmax, Gymax and Gxmax, as acceleration limits, from the limit setting block 22.

At subsequent S130, the target momentum calculation block 24 acquires a curvature radius and a variation in gradient of the road at an object node, as calculated by the road profile calculation block 23, and also acquires an inter-node distance. The curvature radius of the road at an object node is acquired from the information related to either one of the two links connected to the object node. The inter-node distance refers to a distance between the object node extracted in the previous cycle and the object node extracted in the current cycle (i.e. link length).

At subsequent S140, the target momentum calculation block 24 is able to calculate a speed limit limiting the target speed of the own vehicle, based on the Gymax acquired at S120 and the curvature radius of the road at the object node acquired at S130. The speed limit calculated at this step is referred to as Vymax.

Figure 8:
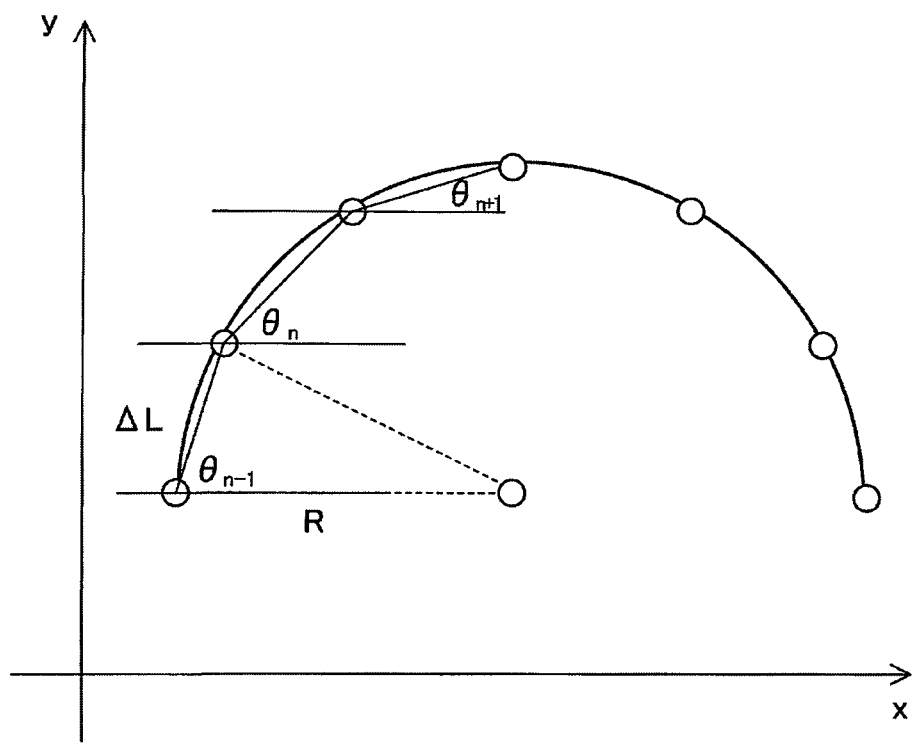
FIG. 8 is a diagram illustrating a method of calculating Vymax and Vzmax.

Specifically, Vymax is calculated as follows. It should be noted that, as shown in FIG. 8, the vehicle 100 is assumed to be making steady circular turning in the x-y plane. The curved line shown in FIG. 8 indicates a road profile that is curved ahead of the own vehicle. The points on the curved line of FIG. 8 respectively indicate nodes ahead of the own vehicle.

Specifically, of the vehicle speeds V that satisfy the following inequality of formula (1) defining the centrifugal force applied to the vehicle 100, the maximum value is calculated as Vymax from the following formula (2). In formulas (1) and (2), M indicates the weight of the vehicle 100, and R indicates the curvature radius of the road.

[Math. 1]
$$M\frac{V^2}{R} \leq MGy_{max} \quad (1)$$

[Math. 2]
$$Vy_{max} = \sqrt{RGy_{max}} \quad (2)$$

Thus, according to formula (2), Vymax can be calculated based on Gymax and the curvature radius of the road. Vymax can also be calculated using the coordinate information of the node instead of the curvature radius of the road.

Specifically, let us assume that the orientation of the vehicle 100 has changed from θn−1 to θn during Δt seconds that is the time taken for the vehicle 100 to move between nodes. θn−1 indicates the orientation of the vehicle 100 in terms of angle at the object node extracted in the previous cycle, and θn indicates the orientation of the vehicle 100 in terms of angle at the object node extracted in the current cycle. In this case, a yaw rate γ of the vehicle 100 is expressed by the following formula (3). In formula (3), Δθn indicates variation in orientation of the vehicle 100.

[Math. 3]
$$\gamma = \frac{\theta_n - \theta_{n-1}}{\Delta t} = \frac{\Delta \theta_n}{\Delta t} \quad (3)$$

In the steady circular turning, assuming that one turn corresponds to 2π and the time taken for the vehicle 100 to make one turn is 2πR/V, the following formula (4) is established.

[Math. 4]
$$\gamma = \frac{2\pi}{\frac{2\pi R}{V}} = \frac{V}{R} \quad (4)$$

Further, when the inter-node distance in the x-y plane is taken to be ΔL, the following formula (5) is established.

[Math. 5]
$$\Delta t = \frac{\Delta L}{V} \quad (5)$$

The following formula (6) is obtained from formulas (3), (4) and (5).

[Math. 6]
$$R = \frac{\Delta L}{\Delta \theta_n} \quad (6)$$

By substituting formula (6) into formula (1), the following formula (7) is obtained.

[Math. 7]
$$Vy_{max} = \sqrt{\frac{\Delta L}{\Delta \theta_n} Gy_{max}} \quad (7)$$

As shown in formula (7), Vymax can be calculated from Gymax, variation in orientation of the vehicle 100, and inter-node distance. Variation in orientation of the vehicle 100 can be obtained from the coordinates of the respective nodes.

Referring back to FIG. 7, at the subsequent S150, the target momentum calculation block 24 calculates a speed limit limiting the target speed of the own vehicle, based on the Gzmax acquired at S120 and the variation in gradient at the object node acquired at S130. The speed limit calculated at this step is expressed by Vzmax.

Specifically, Vzmax is calculated from the following formula (8). In formula (8), ΔLz indicates inter-node distance in the x-z plane, and Δθn indicates variation in road gradient.

[Math. 8]
$$Vz_{max} = \sqrt{\frac{\Delta L_z}{\Delta \theta_{zn}} Gz_{max}} \quad (8)$$

Specifically, replacing the x-y plane shown in FIG. 8 with the x-z plane, variation in orientation of the vehicle 100 is taken to be variation in road gradient. Thus, as shown in FIG. (8), Vzmax can be calculated from the Gzmax, the variation in road gradient, and the inter-node distance in the x-z plane.

Then, at S160, the target momentum calculation block 24 acquires Vlim selected by the limit setting block 22.

Then, at S170, the target momentum calculation block 24 selects the smallest one of the Vymax calculated at S140, the Vzmax calculated at S150, and the Vlim acquired at S160. The speed limit selected at this step is indicated as Vmax.

Finally, the target momentum calculation block 24 calculates, at S180, a target speed that satisfies the limiting conditions of the Vmax that is the speed limit selected at S170, and of the Gxmax that is one of the acceleration limits acquired at S120, and terminates the present process. Specifically, the target momentum calculation block 24 calculates a maximum speed which is not more than the Vmax at the object node extracted in the current cycle and has a rate of change of not more than the Gxmax relative to the speed at the object node extracted in the previous cycle. Thus, the target momentum calculation block 24 determines an optimized target speed.

(1-6. Limit Setting Process)

Figure 9:
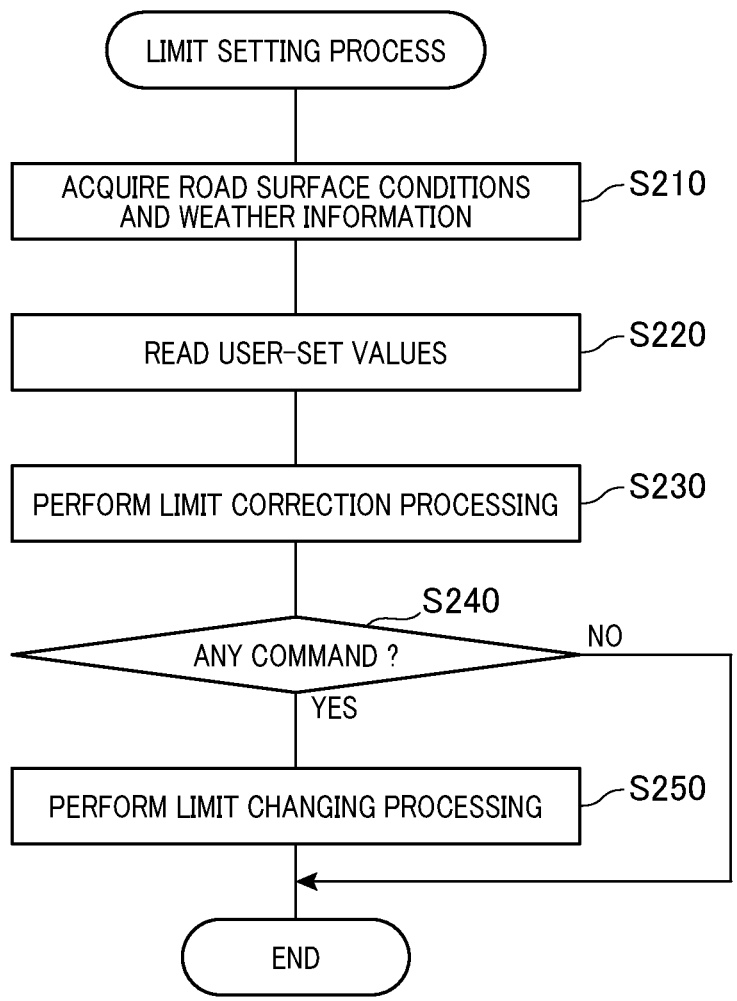
FIG. 9 is a flow diagram illustrating a limit setting process.

Referring now to the flow diagram of FIG. 9, a description will be given of a process (hereinafter referred to as the limit setting process) executed by the limit setting block 22. The limit setting process is iterated while the advanced drive system 1 is activated.

Upon start of the present process, the limit setting block 22 acquires first, at S210, road surface conditions related to the road ahead of the own vehicle, and information indicating the weather in the vicinity of the own vehicle from the forward information acquisition unit 17. Then, at the subsequent S220, the limit setting block 22 reads limits stored as a user-set value from the memory 14. The limits read from the memory 14 at this step include an acceleration limit, a jerk limit, and a speed limit.

At the subsequent S230, the limit setting block 22 executes processing (hereinafter referred to as the limit correction processing) of correcting the limits read at S220, based on either of the road surface conditions and the information indicating the weather acquired at S210. For example, the limit correction processing is performed such that, if the road surface is wet, show-covered, or frozen, or if it is raining or snowing, the limit setting block 22 reduces at least one of the acceleration limit, the jerk limit, and the speed limit. The limit corrected in this way is used as a limit outputted from the limit setting block 22 to the target momentum calculation block 24.

At the subsequent S240, the limit setting block 22 determines whether there is a command from the limit correction block 32. If it is determined that there is no command from the limit correction block 32, the present process is terminated. If it is determined that there is a command from the limit correction block 32, the limit setting block 22 allows control to proceed to the subsequent S250. At S250, the limit setting block 22 executes limit changing processing according to the command and then terminates the present process. The limit changing processing is performed by temporarily reducing the acceleration limit or the jerk limit, followed by variably setting the acceleration limit or the jerk limit to be outputted to the target momentum calculation block 24 in such a way that the limit gradually increases to a reference value that is the value before being reduced.

(1-7. Advantageous Effects)

The first embodiment specifically described above exerts advantageous effects as follows.

(1a) The command calculation unit 20 uses Gzmax and variation in road gradient for the adjustment of the drive command. Therefore, when the road gradient varies, an excessive force of acceleration or deceleration is less likely to be imposed on the own vehicle in the vertical direction. Accordingly, the occupant is less likely to have a feeling of excessive uneasiness, such as a floating feeling, during traveling.

(1b) The command calculation unit 20 adjusts the drive command using the Vzmax calculated based on Gzmax and variation in road gradient to favorably obtain a vehicle speed which prevents an excessive force of acceleration or deceleration from being applied to the own vehicle in the vertical direction.

(1c) The command calculation unit 20 adjusts the drive command using a speed limit which is a smaller one of Vzmax and Vymax. Accordingly, a vehicle speed which prevents an excessive centrifugal force from being applied to the own vehicle in the lateral direction is also favorably obtained.

(1d) The command calculation unit 20 adjusts the drive command using the smallest one of Vzmax, Vymax and Vlim. Accordingly, a vehicle speed which does not exceed the user-set value or the legal speed is obtained.

(1e) The command calculation unit 20 calculates a target speed using Gxmax and a speed limit. Accordingly, a vehicle speed is which prevents an excessive force of acceleration or deceleration from being applied to the own vehicle in the longitudinal direction is also favorably obtained.

(1f) The command calculation unit 20 determines an acceleration limit, based on at least either of the weather and the road surface conditions. Thus, for example, the command calculation unit 20 makes the acceleration limit smaller if the road surface is likely to cause skidding to the own vehicle to thereby make the own vehicle behaviors more stable.

(1A) In the advanced drive system 1, when the output of the drive command is restarted after being stopped by the output control unit 30, the acceleration limit or the jerk limit is ensured to be temporarily reduced. Thus, when the acceleration and deceleration control of the own vehicle that has been temporarily deactivated is restored, the drive command is prevented from being excessively reduced. Accordingly, uneasiness that the driver would feel is minimized, and more efficient acceleration and deceleration control is realized.

(1B) The acceleration limit, which has been temporarily reduced by the output control unit 30, is ensured to be gradually increased to a reference value that is the value before being reduced. Thus, the advanced drive system 1 is moderately reactivated, while minimizing the uneasiness that the driver would feel.

(1C) In the advanced drive system 1, when the output of the drive command is restarted after being stopped by the output control unit 30, at least one of Gxmax, Gymax and Gzmax is ensured to be temporarily reduced. Thus, there is no need to calculate the acceleration limit, and accordingly more efficient acceleration and deceleration control can be achieved.

(1D) The output control unit 30 is ensured to stop outputting the drive command, based on the input from at least one of driver's operations, i.e. accelerator operation, brake operation, and shift operation. Thus, the advanced drive system 1 is favorably deactivated by, for example, the driver depressing the accelerator pedal or the brake pedal in an attempt to accelerate or decelerate the own vehicle, or performing shifting down or shifting up operation. Furthermore, when the advanced drive system 1 is reactivated, the limitation related to acceleration and deceleration of the own vehicle is augmented. This augmentation of limitation can prevent or reduce the occurrence of strong acceleration or deceleration that does not meet the driver's sense of acceleration or deceleration.

(1E) The output control unit 30 is ensured to stop outputting the drive command, based on the input from another control system, i.e. a control system for preventing skidding of the wheels of the own vehicle. Thus, for example, with the activation of the ABS 5 or the TCS, the advanced drive system 1 can be favorably deactivated. Furthermore, since the limitation related to acceleration and deceleration of the own vehicle is augmented when the advanced drive system 1 is reactivated, behaviors of the own vehicle easily become stable. Thus, the ABS 5, the TCS, or other control systems is prevented from being reactivated.

2. Second Embodiment

2-1. Differences from the First Embodiment

The basic configuration of the second embodiment is similar to that of the first embodiment. Therefore, the following description is focused on the differences from the first embodiment. The components similar to those of the first embodiment are given the same reference signs. For these components, previous description should be referred to.

Figure 10:
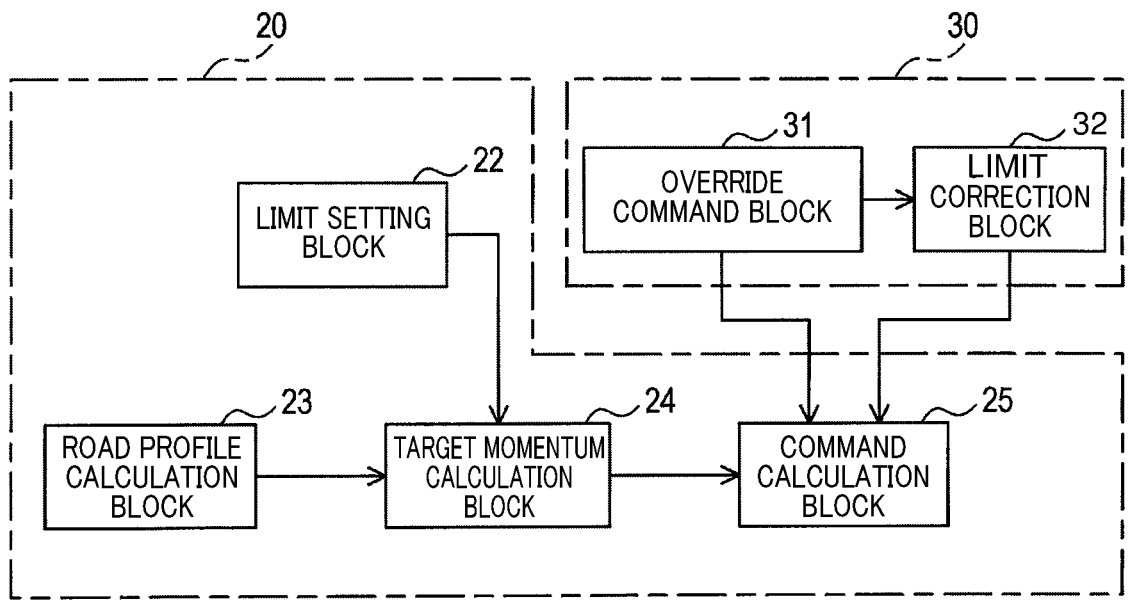
FIG. 10 is a second block diagram illustrating configurations of a command calculation unit and an output control unit.

In the first embodiment, the limit correction block 32 is configured to output the command for temporarily reducing the acceleration limit or the jerk limit, to the limit setting block 22. As shown in FIG. 10, the second embodiment is different from the first embodiment in that the limit correction block 32 outputs the command for temporarily reducing the drive command, to the command calculation block 25.

Specifically, it is so configured that, when restarting the output of the drive command that has been stopped by the output control of the override command block 31, the limit correction block 32 temporarily reduces the drive command outputted from the command calculation block 25.

Figure 11:
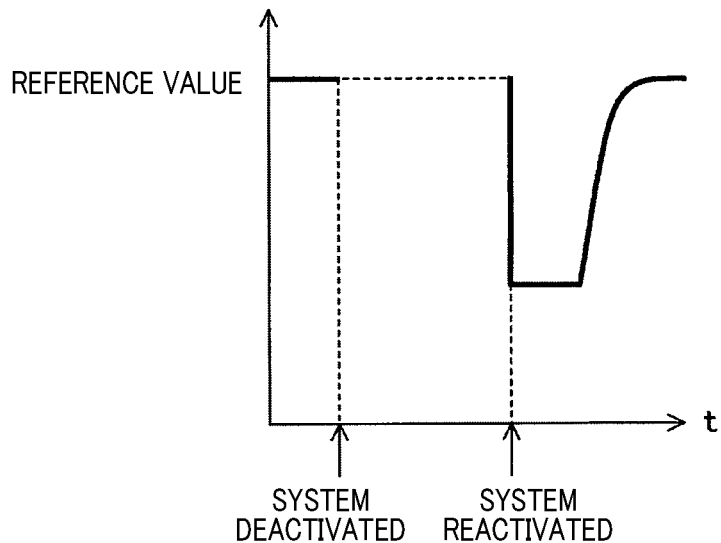
FIG. 11 is a graph illustrating variation in coefficient to be multiplied with drive command.

More specifically, when such an advanced drive system 1 is reactivated, the limit correction block 32 variably sets the coefficient to be multiplied with the drive command outputted from the command calculation block 25 within the range of 0 to 1. Thus, the limit correction block 32 can temporarily reduce the drive command, and then, for example, gradually increase the reduced drive command to one before being reduced. That is, as shown in FIG. 11, when the advanced drive system 1 is reactivated, the limit correction block 32 temporarily reduces the adjustment value (i.e. the coefficient) to be multiplied with the drive command. Then, after lapse of a predetermined period, the limit correction block 32 gradually increases the coefficient to a reference value (i.e. value 1) that is the coefficient before the advanced drive system 1 is deactivated.

The limit correction block 32 may be configured to variably set the coefficient to be multiplied with the target speed which is calculated by the command calculation block 25 to thereby temporarily reduce the drive command.

2-2. Advantageous Effects

The second embodiment specifically described above exerts the advantageous effects (1a) to (10, and (1D) and (1E) of the first embodiment, and further exerts the following advantageous effects.

(2A) In the advanced drive system 1, the drive command is ensured to be temporarily reduced when restarting the output of the drive command that has been stopped by the drive control unit 30. Accordingly, the behaviors of the own vehicle can be more reliably made stable. Thus, when the acceleration and deceleration control of the own vehicle is restored after being temporarily deactivated, reliability of not giving the driver an uneasy feeling is more improved.

(2B) In the advanced drive system 1, after the coefficient to be multiplied with the drive command is temporarily reduced by the output control unit 30, the coefficient is ensured to be gradually increased to a reference value that is the coefficient before being reduced. Thus, normal activation of the advanced drive system 1 is moderately restarted so that the driver is less likely to feel uneasiness.

3. Other Embodiments

Some embodiments of the present disclosure have so far been described. However, the present disclosure should not be limited to the embodiments described above, but may be implemented by being variously modified.

(3a) In the embodiments described above, the target momentum calculation block 24 is ensured to calculate a target speed, and the command calculation block 25 is ensured to calculate a target acceleration based on the target speed. However, the configuration of calculating a target acceleration should not be limited to this configuration. For example, the target momentum calculation block 24 may calculate both a target speed and a target acceleration, and the command calculation block 25 may calculate a drive command based on the target acceleration.

(3b) A plurality of functions of a single component in the above embodiments may be implemented by a plurality of components, or one function of a single component may be implemented by a plurality of components. Alternatively, a plurality of functions of a plurality of components may be implemented by a single component, or one function implemented by a plurality of components may be implemented by a single component. Alternatively, part of the configuration of the above embodiments may be omitted. Alternatively, at least part of the configuration of an embodiment described above may be added to or replaced by the configuration of another embodiment described above. Any mode which is encompassed by the technical idea specified by the wording of the claims should be an embodiment related to an aspect of the present disclosure.

(3c) Besides the advanced drive system 1 described above, an aspect of the present disclosure can be implemented in the form of various modes, such as an in-vehicle system including the advanced drive system 1 as a component, an acceleration and deceleration control unit 10 configuring the advanced drive system 1, a program for allowing a computer to function as the advanced drive system 1, the in-vehicle system, or the acceleration and deceleration control unit 10, a non-transitory tangible recording medium, such as a semiconductor memory, recorded with this program, a driving support method, an acceleration and deceleration control method, and any other modes.

The invention claimed is:

1. An acceleration and deceleration control system that controls acceleration and deceleration of an own vehicle, the acceleration and deceleration control system comprising:
    a forward information acquisition unit configured to acquire, using a processor, a road profile ahead of the own vehicle;
    a position acquisition unit configured to acquire, using the processor, a current position of the own vehicle;
    a state acquisition unit configured to acquire, using the processor, a current state of the own vehicle; and
    a command calculation unit configured to calculate, using the processor, a target speed at each point on a road ahead of the own vehicle, based on the road profile and the current position, and calculate a drive command for driving the own vehicle in the longitudinal direction of the own vehicle, based on the target speed and the current speed, wherein:
    the road profile includes a road gradient; and
    the command calculation unit is configured to calculate a speed limit limiting the target speed, based on variation in the road gradient and Gzmax that is an acceleration limit limiting acceleration of the own vehicle in the vertical direction, and adjust the drive command, based on the calculated speed limit.

2. The acceleration and deceleration control system according to claim 1, wherein:
    when the speed limit is Vxmax, an axis along a longitudinal direction of the own vehicle is an x axis, an axis along a lateral direction of the own vehicle is a y axis, an axis along a vertical direction of the own vehicle is a z axis, the command calculation unit is configured to calculate the Vxmax using the Gzmax, $\Delta Lz$, and $\Delta\theta zn$, where the $\Delta Lz$ is an intra-node distance in an x-z plane that is stored in map information, and the $\Delta\theta zn$ is variation in the road gradient.

3. The acceleration and deceleration control system according to claim 1, wherein:
    the road profile includes a curvature radius of a road;
    the command calculation unit is configured to use, when the drive command is adjusted, the speed limit that is a smaller one of: Vzmax that is the speed limit calculated based on the Gzmax and variation in the road gradient; and Vymax that is the speed limit calculated based on the curvature radius and Gymax that is an acceleration limit limiting acceleration of the own vehicle in the lateral direction; and
    the command calculation unit is configured to use, when the drive command is adjusted, the speed limit that is the smallest one of the Vzmax, the Vymax, and Vlim that is the speed limit inputted by a user in advance, or a legal speed related to a road on which the own vehicle is traveling.

4. The acceleration and deceleration control system according to claim 3, wherein:
    the command calculation unit is configured to calculate the target speed, based on the speed limit and Gxmax that is an acceleration limit limiting acceleration in the longitudinal direction of the own vehicle.

5. The acceleration and deceleration control system according to claim 4, wherein:
    the command calculation unit is configured to variably set the acceleration limit, based on information that indicates at least either of the weather and road surface conditions.

6. The acceleration and deceleration control system according to claim 1, wherein:
    the road profile includes a curvature radius of a road; and
    the command calculation unit is configured to use, when the drive command is adjusted, the speed limit that is a smaller one of: Vzmax that is the speed limit calculated based on the Gzmax and variation in the road gradient; and Vymax that is the speed limit calculated based on the curvature radius and Gymax that is an acceleration limit limiting acceleration of the own vehicle in the lateral direction.

7. The acceleration and deceleration control system according to claim 6, wherein:
    the command calculation unit is configured to use, when the drive command is adjusted, the speed limit that is the smallest one of the Vzmax, the Vymax, and Vlim that is the speed limit inputted by a user in advance, or a legal speed related to a road on which the own vehicle is traveling.

8. The acceleration and deceleration control system according to claim 1, wherein:
    the command calculation unit is configured to calculate the target speed, based on the speed limit and Gxmax that is an acceleration limit limiting acceleration in the longitudinal direction of the own vehicle.

9. The acceleration and deceleration control system according to claim 1, wherein:
the command calculation unit is configured to variably set the acceleration limit, based on information that indicates at least either of the weather and road surface conditions.

10. An acceleration and deceleration control method for controlling acceleration and deceleration of an own vehicle, the acceleration and deceleration control method comprising:
acquiring, using an acceleration and deceleration control system, a road profile, including a road gradient, ahead of the own vehicle;
acquiring, using the acceleration and deceleration control system, a current position of the own vehicle;
acquiring, using the acceleration and deceleration control system, a current speed of the own vehicle;
calculating, using the acceleration and deceleration control system, a target speed at each point on a road ahead of the own vehicle, based on the road profile and the current position;
calculating, using the acceleration and deceleration control system, a drive command for driving the own vehicle in the longitudinal direction of the own vehicle, based on the target speed and the current speed; and
when the drive command is calculated, calculating, using the acceleration and deceleration control system, a speed limit limiting the target speed, based on variation in the road gradient and Gzmax that is an acceleration limit limiting acceleration of the own vehicle in the vertical direction, and adjusting the drive command, based on the calculated speed limit.

* * * * *